(12) United States Patent
Masschelein et al.

(10) Patent No.: US 11,659,630 B2
(45) Date of Patent: May 23, 2023

(54) HEATABLE GLAZING PANEL

(71) Applicant: AGC GLASS EUROPE, Louvain-la-Neuve (BE)

(72) Inventors: Peter Masschelein, Huldenberg (BE); Romain Dacquin, Basecles (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 511 days.

(21) Appl. No.: 15/559,546

(22) PCT Filed: Mar. 18, 2016

(86) PCT No.: PCT/EP2016/055941
§ 371 (c)(1),
(2) Date: Sep. 19, 2017

(87) PCT Pub. No.: WO2016/156066
PCT Pub. Date: Oct. 6, 2016

(65) Prior Publication Data
US 2018/0098386 A1      Apr. 5, 2018

(30) Foreign Application Priority Data

Mar. 30, 2015   (EP) ..................................... 15161716

(51) Int. Cl.
*H05B 3/84*        (2006.01)
(52) U.S. Cl.
CPC ......... *H05B 3/84* (2013.01); *H05B 2203/003* (2013.01); *H05B 2203/004* (2013.01);
(Continued)

(58) Field of Classification Search
CPC ................ H05B 3/84; H05B 2203/003; H05B 2203/004; H05B 2203/031;
(Continued)

(56) References Cited

U.S. PATENT DOCUMENTS

| 4,994,650 A | 2/1991 | Koontz |
| 5,434,384 A | 7/1995 | Koontz |

(Continued)

FOREIGN PATENT DOCUMENTS

| EP | 0 524 537 A2 | 1/1993 | |
| EP | 0524537 A2 * | 1/1993 | ............... H05B 3/84 |

OTHER PUBLICATIONS

International Search Report dated Jun. 9, 2016 in PCT/EP2016/055941 filed Mar. 18, 2016.

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

An electrically heatable glazing panel including a substrate and at least a first electrically heatable zone including: (i) a substantially transparent, electrically conductive coating layer, (ii) at least first and second spaced bus bars substantially parallel and configured to supply electrical voltage across the substantially transparent, electrically conductive coating layer, and (iii) a conductive pathway defined between the at least the first and the second busbars. The glazing panel further includes a conductive pathway provided by a pattern of coated and decoated regions in the substantially transparent electrically conductive coating layer of electrically heatable zone to affect electrical resistivity of the coating in the first electrically heatable coated zone.

25 Claims, 2 Drawing Sheets

Figure 1:
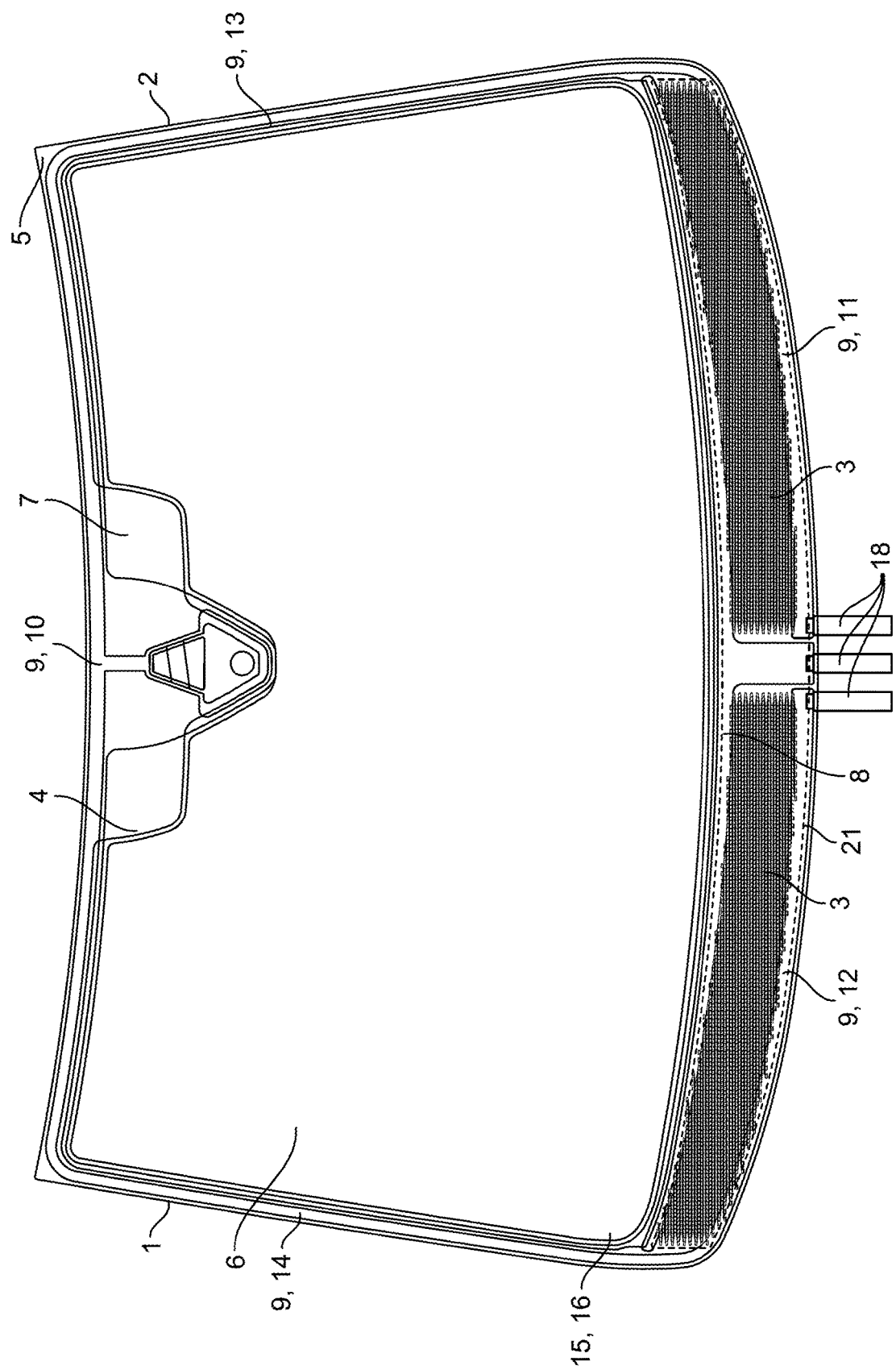

(52) U.S. Cl.
CPC .. *H05B 2203/005* (2013.01); *H05B 2203/011* (2013.01); *H05B 2203/013* (2013.01); *H05B 2203/031* (2013.01)

(58) Field of Classification Search
CPC ........ H05B 2203/011; H05B 2203/013; H05B 2203/005
USPC ....................................................... 219/203
See application file for complete search history.

(56) References Cited

U.S. PATENT DOCUMENTS

| | | | |
|---|---|---|---|
| 2006/0201932 A1* | 9/2006 | Degand | H05B 3/84 219/543 |
| 2007/0187383 A1 | 8/2007 | Wipfler et al. | |
| 2011/0017727 A1* | 1/2011 | Choi | C03C 17/04 219/552 |
| 2012/0000896 A1* | 1/2012 | Phan | B32B 17/10761 219/203 |
| 2012/0103961 A1* | 5/2012 | Offermann | B32B 17/10761 219/203 |

* cited by examiner

HEATABLE GLAZING PANEL

The present invention relates to an electrically heatable glazing panel.

The invention relates particularly to an automotive electrically heatable glazing panel and more particularly to a windshield which comprises a system of thin electrically conductive layers.

Windshield of this type are those originally developed to confer as properties a filter against infrared rays. Such systems comprise one or more metal layers essentially consisting of silver associated with dielectric layers that, firstly protect the metal layers, and on the other hand, correct the effects of these layers on the transmitted spectrum and mostly reflected, so that they have a colour as "neutral" as possible.

Electrically conductive layer systems are also available to heat the automotive glazing panel or particularly a windshield in order to defog or defrost it.

In this application a well-recognized difficulty is the need to achieve layers whose resistance is low enough to allow for availability of appropriate power.

The output power is firstly limited by the voltage available on the vehicle, typically 12-14v and secondly because of the need of maintaining the thickness of the metal layers such as the light transmission in the area of wavelengths of the visible remains sufficient to meet regulatory requirements in this area, 70 or 75% depending on the country.

Obtaining the powers required to defrost in sufficient speed conditions, are often at the limit of the technical possibilities, especially because of the increasing size of modern windshield.

Car manufacturers are now asking to have the windshield where the wiper rest area can be heated more intensely than the rest of the windscreen.

The goal is to ensure that, even taken in the frost, the wipers are rapidly released to help wiping the rest of windshield and hasten the complete elimination of frost.

The need to have on the surface of the windshield an area with a higher power per unit has led to different solutions.

Two main types of systems are proposed. The first uses the same layer system which heats partially or totally the windscreen and delimit the different zones by the location of the supply conductors, called "busbars".

More the busbars are close to each other on either side of the area to be heated, more the resistance is low and the power per unit area could be high.

In the wiper rest area, which is necessarily of limited size, the busbars can be very close and the power per unit area could thus be relatively high.

This interesting solution raises questions about the presence of multiple busbars on the windshield, their arrangement must take into account the fact that they must be hidden from the view of the outside observer to the vehicle.

Another type of heating means is the use of a heating wires network on location of the wiper rest position or a network of screen printed silver paste.

The choice of heating wires network allows easily to achieve the necessary powers by choosing the material of the wires which does not have the constraint of transparency of the heating layer system heating he rest of the windshield.

In the case of heatable glazing panels comprising when a voltage is applied on the electrically conductive layer, an electrical current flows through the electrical conductive layer, resulting in power dissipation and heating. When submitting such glazing panels to a given voltage, the amount of heat generated will be substantially uniform throughout the whole surface of the glazing panel covered with the conductive coating layer.

In the case of heatable glazing panels comprising an electrically conductive coating layer and being of substantially regular shape, for example rectangular shape, electrical current is brought to a conductive coating layer through. Thus when a voltage is applied on the electrically conductive layer, an electrical current flows through the electrical conductive layer, resulting in power dissipation and heating.

In the case of heatable glazing panels of substantially irregular shape, for example glazing panels with application in the automotive, railway or aeronautical field, spaced busbars which diverge at at least one portion along their length may be used. The distance between the busbars therefore varies and consequently the electrical resistance of the current path also varies. Therefore, when submitting such glazing panels to a given voltage, the amount of heat generated will vary along the length of the busbars, thereby creating the risk of local areas of overheating which may damage or destroy the conductive coating layer. Also and more likely, PVB interlayer will be damaged resulting in possible delamination, bubbles, . . . .

Furthermore, when such heatable glazing panels are used for de-misting or de-icing purposes, certain areas may demist or deice more rapidly than others. This may create problems of visibility for an observer looking through such a glazing panel.

According to one aspect, present invention provides a heatable glazing panel comprising a substrate and at least a first electrically heatable zone comprising:
  i) a substantially transparent, electrically conductive coating layer,
  ii) at least a first and a second spaced bus bars substantially parallel adapted to supply electrical voltage across the substantially transparent, electrically conductive coating layer, and
  iii) a conductive pathway defined between the at least the first and the second busbars.

According to the invention, the conductive pathway defined between the at least the first and the second busbars is provided with a pattern of coated and decoated regions in the substantially transparent electrically conductive coating layer of the electrically heatable zone to effect the electrical resistivity of the coating in the first electrically heatable coated zone.

Advantageously, the electrically heatable glazing panel according to the invention is implemented as a heating laminated vehicle windshield window comprising two glass sheets joined together by a thermoplastic interlayer, comprising a substantially transparent, electrically conductive coating layer on the inner side of one of the glass sheets covering most of the surface of a windshield glass sheet electrically powered by bus bars located at least in the wiper rest area delimiting the at least the first electrically heatable zone.

Thus, preferably, the at least first electrically heatable zone extends substantially in the wiper rest area on a lower edge of the glazing panel.

In one preferred embodiment, more than one electrically heatable zones are present on the glazing panels. Preferably, a second electrically heatable zone extends substantially in the zone above the wiper rest area. Particularly, in case of windshield, a first electrically heatable zone is delimited by the wiper zone and a second zone represents the rest of the windshield covered with the electrically conductive coating layer.

Each zone may comprise a distinct pair of busbars. The expression "distinct pair of busbars" as used herein means that the bus bars serve only a single electrically heatable zone. Alternatively, one or more busbars may be adapted so as to serve more than one electrically heatable zone.

The heat generated when applying a voltage across the spaced busbars may be substantially the same over the surface between the spaced busbars. This may be assessed, for example, by comparing the average temperature at one 5 cm$^2$ area of the glazing panel and comparing this with the average temperature at another, spaced 5 cm$^2$ area of the glazing panel, particularly when the glazing panel has been heated for a sufficient length of time for it to reach a stable or equilibrium temperature with its surroundings. In one embodiment, the glazing panel may thus be de-iced or de-misted substantially uniformly.

Preferably, the glazing panel is substantially covered with the electrically conductive coating layer; for example, at least 60%, 70%, 75%, 80% 85%, 90% or 95% of the glazing panel may be covered with the coating layer. This may provide a glazing panel with optical properties (for example reflection, colour in reflection, total visible light transmission, total energy transmission) which are substantially the same in each zone and preferably substantially the same over the entire visible surface of the glazing.

Preferably, the glazing panel comprises at least two electrically heatable zones, for example, 2, 3, 4, 5, 6, 7, 8, 9, 10, 12, 15, 20, 30 or more zones.

In a special embodiment of the electrically heatable glazing according to the invention as a motor vehicle windshield, it comprises at least a first and a second busbars located horizontally along the wiper rest area and from either side of the first electrically heatable zones along the length of the lower edge of the glazing panel.

Preferably, the first busbar is placed horizontally in the upper part of the wiper zone and the second busbar is placed horizontally in the lower part of the wiper zone, the first and second busbars are substantially parallel. For example, busbars are metallic bus bars, which are substantially parallel one to another. In this particular case the distance between the busbars along their whole length remains substantially the same. The electrical resistance of the current path along the length of the busbars is therefore substantially the same.

Advantageously, the busbars are located along the length of a same edge of the glazing panel, for example, along a lower edge of the glazing panel; this may facilitate masking of the bus bars from view, for example, by covering the busbars with an enamel or other masking agent or by arranging for the bus bars to be hidden in use, for example by part of the bodywork of a vehicle.

The electrically heatable zones may be delimited by one or more zone boundaries which are substantially insulating. The expression "substantially insulating" as used herein refers to a zone boundary which is less electrically conductive than the coating layer or which is substantially non-conductive of electrical current.

According to the invention, a conductive pathway is defined between the first and the second bus bars.

The conductive pathway is provided by a pattern of coated and decoated regions in the substantially transparent electrically conductive coating layer of first electrically heatable zone to affect the electrical resistivity of the coating in the first electrically heatable coated zone.

Thus, thanks to the pattern of coated and decoated regions in the substantially transparent electrically conductive coating layer, the heating power could be adjusted. It is understood that the power depends on pattern type and dimension of the pattern. The said pattern is designed between the at least the first and the second busbars. Without the pattern of coated and decoated regions in the substantially transparent electrically conductive coating layer, the at least first and the second busbars could be too close to each other, depending on the specific design and the electrical properties of the coating leading to an overheating.

The length of the pattern influences heating power, thus the design should be adapted to requested heating power between the at least the first and the second busbars. In case of windshield, the length may extend over the wiper rest zone or may be extend over a part of the wiper rest zone.

Regarding the size of the pattern, the size influences heating homogeneity. Thus, the size may be adapted to have the best homogeneity between the at least first and second busbars.

Preferably, the conductive pathway have a fixed pattern, thus the pattern of the conductive pathway is not changed or varied during a heating cycle of the glazing. Preferably, the voltage is applied to the busbars at the same time in order to favour a rapid and uniform heating of the glazing panel.

According to the invention, the conductive pathway is provided by at least one pattern of coated and decoated regions in the substantially transparent electrically conductive coating layer of the electrically heatable zone. The one or more patterns of coated and decoated regions in the substantially transparent electrically conductive coating layer of the electrically heatable zone may have an electrical resistance such that substantially no electrical current flows through it when a voltage is applied between the bus bars and thus may be substantially not conductive. The one or more non-coated portion may be provided by applying pattern wise to the substrate a masking agent before depositing the electrically conductive layer and removing subsequently the masking agent covered with the coating layer. Alternatively, the one or more non-coated portion may be provided by removal of the conductive coating layer after deposition. Advantageously, the coating layer may be removed with a laser, for example a laser DIODE. The conductive pathways may be substantially invisible to the naked eye, particularly if formed by laser removal of part of the coating layer.

One advantage of the use of the masking technology is if two zones have to be separated, there would only be a fine line and not a big zone, therefore no coating free zone that is not heated and no need for an additional wire in the PVB to heat this zone. Thus according to the invention, the process to manufacture an electrically heatable glazing panel is simplified and the cost is reduced.

Advantageously, the pattern of conductive pathway consists of a succession of parallel patterns having the form of zigzag or sinusoid lines forms. The succession of parallel patterns having the form of zigzag is preferably made perpendicularly to at least a first and second busbars in the first electrically heatable zone. The amplitude of each wave is determined by the requested heating homogeneity within the zone between the at least first and second busbars. It is understood that the pattern in the coating can be adapted to keep the homogeneity and the requested heating power output. However, others patterns may be considered as S-shaped coating lines, angled coating lines, full coating with decoatings in the form of horizontal lines or lines under angle or squares or circles, . . . .

Advantageously, the width of the decoated zone boundary is less than 2500 µm, preferably less than 1500 µm, more preferably less than 1000 µm, most preferably less than 600

μm. A zone boundary may delimit or substantially delimit one electrically heatable zone from another decoated zone.

The busbars may be formed by deposition of a noble metal paste, for example a silver paste or by deposition of a metallic ribbon.

Arranging the electrically conductive coating layer to be a solar control coating layer may enable the functions of preventing excessive passage of solar energy through the glazing to be combined with the heatability of the glazing panel. The term "solar control" refers herein to a coating layer which increases the selectivity of a substrate, that is, increases the ratio of incident visible light transmitted through a substrate to the incident solar energy transmitted through the substrate. Alternatively, the conductive coating layer may be a low emissivity coating.

The conductive coating layer may be deposited by a vacuum deposition technique, for example by magnetron sputtering, or be pyrolytically formed, for example by chemical vapour deposition. The coating layer is preferably applied over the entire surface or over the majority of the surface of the substrate.

In a preferred embodiment of the present invention, the coating film comprises at least one metallic infra-red reflective layer. The coating film may comprise a sequence of layers as follows: dielectric layer/silver/dielectric layer or dielectric layer/silver/dielectric layer/silver/dielectric layer. The dielectric layers may comprise, for example, tin oxide, zinc oxide, silicon nitride, titanium oxide, aluminium oxide or mixtures of one or more thereof.

The electrically conductive coating layer preferably has a sheet resistance comprised between 0.5 and 100 ohms per square, preferably between 0.5 and 25 ohms per square, for example, 0.7, 0.8, 2.2, 3.0, 15 or 20 ohms per square.

In the glazing panel according to the present invention, the substrate may be glass, for example a sheet of flat glass, soda lime glass or float glass, particularly a sheet of glass intended for subsequent use as or incorporated in an architectural or vehicle glazing panel. It may undergo a thermal toughening treatment or a bending treatment before or after the coating layer has been deposited onto at least part of its surface. Alternatively, the substrate may be a rigid or flexible plastics sheet material which may equally be intended for subsequent use as or incorporated in an architectural or vehicle glazing panel.

The electrically conductive coating layer may be provided directly at a surface of the substrate, alternatively, it may be carried by a film, for example, a PET or other plastics sheet material incorporated in a glazing panel.

The present invention is particularly applicable to a glazing panel of substantially irregular shape, that is, a glazing panel which has an acute angle α formed by the lower edge of the glazing panel and by the tangent to a side edge, particularly where α is less than or equal to 60°, 55°, 45°, 40°, 35°, 30°, 25°, 20° or 15° and even more particularly where the first and second bus bars are positioned along or adjacent to those edges. In one embodiment of the invention, at least one edge of the glazing panel may be substantially curved.

The glazing panel may be a side window of a vehicle or a train, a windshield of an aircraft or a glazing panel with applications in the nautical field.

The glazing panel may be adapted to have a voltage of between 10 and 100 volts applied across the bus bars, preferably between 30 and 50 volts. For automobile applications, a voltage of 32 volts, more preferably 36 volts, most preferably 42 volts, is applied. Alternatively, the glazing panel may be adapted to have a voltage of between 10 and 14 volts applied across the bus bars, for example about 12 volts. The heat generated by the zone heatable electrically is preferably comprised between 250 and 2000 watts per square meter.

In embodiments in which more than one pair of spaced busbars are provided, the glazing panel may be adapted to have the same or substantially the same voltage applied across each pair of busbars.

Particularly where the glazing panel is provided in monolithic form, the electrically conductive coating layer may be partially or entirely covered with an additional external coating (which is preferably substantially non electrically conductive), for example a lacquer. This may prevent the electrically conductive coating from being an exposed coating layer and may serve:

to provide electrical insulation between the electrically conductive coating and its surroundings; and/or to protect the electrically conductive coating from abrasion; and/or to reduce tendencies for the electrically conductive coating and/or the zone boundaries to accumulate dirt and/or to become difficult to clean.

A glazing panel according to the invention allows to have a homogeneous heating thanks to the fine pattern of the conductive pathway provided between the at least first and second busbars. In addition, the pattern of the conductive pathway may be adjusted to the variability in distance between busbars and variability in windshield design to keep the heating homogeneous in the wiper rest area.

Furthermore, contrary to traditional process to manufacture an electrically heatable glazing panel heating and particularly an electrically heatable windshield, the process is simplified because there is no to embed heating wires into PVB or to print a silver paste on preferentially face 4 of the glazing panel.

In a preferred embodiment, the pattern of the conductive pathway within the substantially transparent electrically conductive coating layer of the electrically heatable zone is obtained by applying a mask on a glass sheet during carrying out the conductive coating layer.

Thus, according to the invention, the pattern is provided in the same time as the edge deletion of the coating by masking in coater is done.

Advantageously, the coating pattern can be adjusted to the imposed windshield design (black area height in wiper rest area), imposed heating field dimensions, and imposed heating power output. Thus, depending on these parameters the distance between busbars may vary.

In the windshield of prior art, there are some limitations to heat in the bottom corners of the windshield. Because of the vertical busbar layout in the prior art, depending on the windshield design, it can be difficult to have the place for a vertical busbar close the corner of the windshield, resulting in not heating these.

According to the invention, horizontal busbars allow to also heat the windshield corners.

In the prior art, additional process step is necessary to heat in coating free zone. However, according to the invention, the bottom busbar of the heated coated windshield, wherein the heating is in visible area (HCWS) is also used as top busbar for the HCWRA (heating in wiper rest area), there is no need for a coating free zone as when using a vertical busbar layout in the prior art. As a result, the coating can be continuous between HCWS and HCWRA, without a coating free zone.

The invention further extends to a method for producing an electrically heatable glazing panel, comprising the following steps:

produce a glazing panel provided with a substantially transparent electrically conductive coating comprising at least a first and a second electrically heatable zones, wherein the at least a first electrically heatable zone comprises a conductive pathway provided by a pattern of coated and decoated regions in the substantially transparent electrically conductive coating layer of electrically heatable zone to affect the electrical resistivity of the coating in the first electrically heatable coated zone, producing at least two collecting conductors, which are electrically connected to the at least a first and a second electrically heatable zones, such that after application of a supply voltage, in each case an electric current flows over at least one first heating field formed by the first coating zone and at least one second heating field formed by the second coating zone.

Figure 2:
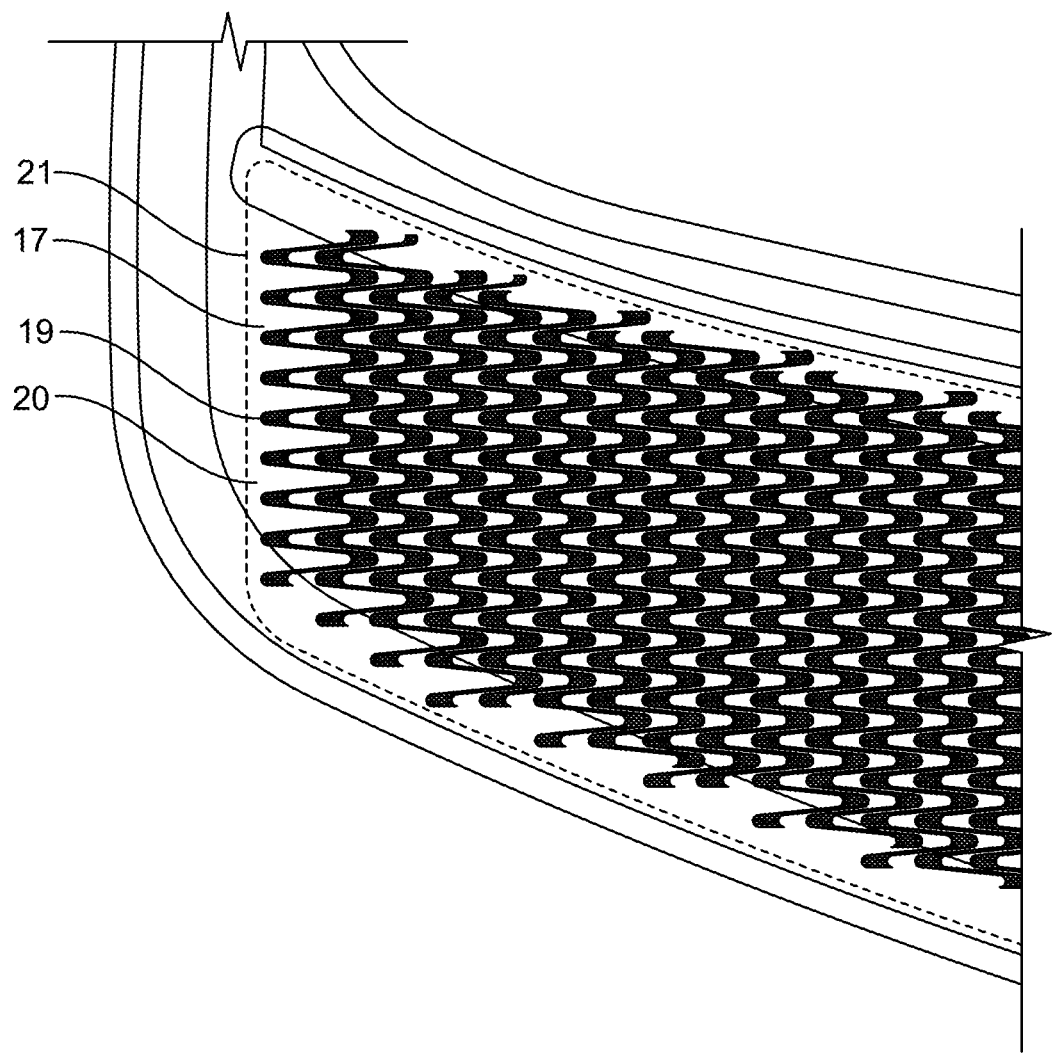

The invention will now be described, by way of example only, with reference to FIG. 1 and FIG. 2. FIG. 1 is a schematic representation of a glazing panel according to the invention. FIG. 2 represents an enlargement view of the conductive pathway.

The FIG. 1 illustrates, as an exemplary embodiment of the invention a transparent glazing panel with a transparent electrically heatable coating, which extends at least over part of the glazing panel surface. The transparent electrically conductive heatable coating consists of two electrically heatable coating zones, wherein the two electrically heatable coating zones are in each case electrically connected to at least two busbars such that after application of a supply voltage that is provided by a voltage source, in each case a current flows over at least one first heating zone formed by the first electrically heatable coating zone and at least one second heating zone formed by the second heatable coating zone. The first heatable coating zone consists of a pattern of coated and decoated regions to affect the electrical resistivity of the coating in the second heatable coating zone. By adjusting the pattern, current flow path length increases, allowing, depending on the chosen pattern, to adjust (reduce) the electrical heating power in the first electrically heatable coating zone to the desired electric heating power. The pattern is necessary to reduce the heating power density (Watt/m$^2$), that is inversely proportional to the distance between the busbars squared.

The figure illustrates, as an exemplary embodiment of the invention, a motor vehicle windshield designates as a whole with the reference number 1, depiction of which corresponds to a typical installation position in the motor vehicle. The windshield 1 is implemented as a composite pane comprising a rigid outer and inner pane, both of which are implemented as individual panes and bonded to each other by a thermoplastic adhesive layer. The two individual panes are approximately the same size, have a trapezoidal curved contour and are made, for example, of glass. For an application other than as a windshield, it is also possible to make the two individual panes from a flexible material. Advantageously, the panes are glass sheets.

The contour of the inner and outer glass sheets is defined by a common outer edge 2. A transparent electrically conductive heatable coating that serves for electric heating of the windshield 1 is deposited on the side of the inner our outer pane that is bonded to the adhesive layer. In this embodiment, the electrically conductive heatable coating is applied over the entire surface of the face 3 of the windshield meaning in the external face of the inner glass sheet, with a non-coated circumferential edge region 5 on all sides. This measure serves for electrical isolation of the electrically conductive heatable coating towards the outside as well as a protection against corrosion penetrating from the edge of the glass sheet. The edge region can be produced by subsequent removal (laser decoating, stripping, mechanical abrasion, brushing, . . . ) or by masking during coating application.

The electrically conductive heatable coating comprises a first electrically conductive heatable coating zone 3 in the wiper rest zone (lower in the installation position) and a second heatable coating zone 6 (upper in the installation position). In this particular FIG. 1, the first electrically conductive heatable zone 3 is separated in two parts (a right and left parts) by a part of the common first collecting conductor 8 that is placed on a region that is not foreseen with coating.

Both zones, first electrically conductive heatable zone 3 and second electrically conductive heatable zone 6, can be galvanically separated from each other as in the present example. In the current invention, this is however not necessary and both heatable coating fields can be continuously electrically connected by coating.

The windshield 1 is further provided with a heating-layer-free communication window 7 for data transmission, camera vision, rain sensor field, which is known to the person skilled in the art. The communication window 7 is extraneous to the understanding of the invention such that it does not have to be dealt with in more detail here.

The transparent electrically conductive heatable coating comprises, in a known matter, a sequence of layers with at least one electrically conductive metallic sublayer, preferably silver (Ag), and, optionally, other sublayers such as antireflection and blocking layers. Advantageously, the sequence of layers has high thermal resistance such that it can survive the high temperatures, typically more than 600° C., necessary for the bending of glass panes without damage, but with the possibility of also providing sequences of layers having low thermal resistance. Instead of being applied directly on the pane, the heatable coating could, for example, also be applied on a plastic film that is subsequently adhered to the outer and inner pane. The electrically conductive heatable coating is for example applied by sputtering. The sheet resistance of the heatable coating can, for example, be as much as a few ohms per square, with the sheet resistance typically in the range from 0.5 to 6 ohms/square.

The two electrically conductive heating layer zones 3,6 are electrically connected to a common first busbars 8 and a common second busbar 9. The first busbar 8 is provided for connection to one pole, for example, the minus pole; the second busbar 9 for connection to the other pole, for example, the plus pole, of a voltage source (not shown). The two busbars 8,9 can, at least theoretically, be divided into different sections based on their function. Thus, the second busbar 9 has an upper transverse part 10 extending along the long upper edge of the pane, which has at least an approximately parallel course to the first busbar 8. The transverse part 10 of the second busbar 9 and the first busbar 8 are in direct electrical contact with the first heatable coating zone 3 for heating the central visual field of the windshield such that icing can be reliably and safely prevented there.

As can, in particular, the outer pane is provided with an opaque layer 15 applied on the side adjacent to the adhesive layer consisting of a full print zone and a dot grid zone 16. The color layer is preferably made of an electrically non-conductive black pigmented material that can be baked into the outer pane. The color layer 18 overlays, in particular, the busbars 8,9.

The second busbar 9 further has a lower left transverse section 12 extending at least approximately parallel to the first busbar 8, slightly angled in the exemplary embodiment, and a correspondingly disposed lower right transverse section 11. The two transverse sections 11,12, are in each case applied on the lower heating layer zone 3 and are in direct electrical contact therewith. The left transverse section 12 is electrically connected via the left longitudinal section 14 to the upper transverse section 10 of the second busbar 9. Correspondingly, the right transverse section 11 is electrically connected via the right longitudinal section 13 to the upper transverse section 10 of the second busbar 9. The two transition sections 13,14 run primarily in the edge region 17 such that an electrical short between the two electrically conductive heatable coating zones 3,6 is prevented. In the top corners of the windshield the transition sections 13,14 can make electrical contact with the second heating layer zone 6, to increase the heating power density in the central visual field of the windshield 1.

The first busbar 8 further has a central longitudinal section, which extends approx. perpendicular towards the windshield edge 2. The central longitudinal section divides the first heatable coating field 3 in two sections. The central longitudinal section is positioned roughly centered on the windshield 1. The central longitudinal section is not in direct electrical contact with the first electrically conductive heatable coating field 3.

The first busbar and the two transverse sections 11, 12 of the second busbar 9 are in direct electrical contact with the two zones of the first electrically conductive heatable coating zone 3, in particular to heat an opaque resting and parked position of the windshield wipers (windshield wiper rest area 21) for wiping the visual field of the windshield 1.

As represented in FIG. 2, the first electrically conductive heatable coating field 3 consists of a pattern of coated 19 and decoated regions 20 to effect the electrical resistivity of the coating in the first electrically conductive heatable coating zone. By adjusting the pattern, current flow path length increases, allowing, depending on the chosen pattern, to adjust (reduce) the electrical heating power in the first electrically conductive heatable coating zone to the desired electric heating power. The pattern is necessary to reduce the heating power density (Watt/m$^2$), that is inversely proportional to the distance between the collecting conductors squared. For example, the coating pattern 17 can consists of a parallel zigzag course or sinusoid forms extending substantially perpendicular to the two busbars 8,9. In the current example the distance between these two busbars 8,9 varies between 60 mm and 70 mm. The coating pattern 17 consists of a series of zigzag coating lines with a width of, depending on the location, 500 μm to 5 mm. This allows to change the length of the current path to increase from around 65 mm to around 360 mm. This current path increase causes for the dissipated heating power, when applying 14V on a coating with sheet resistance of 0.8 Ohm/sq., to drop from well above 1000 Watt/dm$^2$ to around 7 W/dm$^2$. The current invention does not limit the pattern to this example. The coating pattern 17 can be adapted to a specific required output heating power and can consists of other shapes and forms of decoating.

The two busbars 8,9 are made, for example, be produced by printing with a conductive paste, in particular by the screen printing method, which is baked in, for example, during the bending of the windshield 1. They may, for example, be implemented as strip-shaped or band-shaped electrodes. Alternatively they may also be made of thin, narrow metal foil strips of copper or aluminum, for instance, that are fixed, in particular, on the adhesive layer and, at the time of bonding of the outer and inner pane, applied with electrical contact on the heatable coating. Through the action of heat and pressure at the time of bonding of the individual panes, an electrical contact can be ensured.

Through application of a supply voltage on the two busbars 8, 9, the two first electrically conductive heating zones 3 and the second heating zone 6 may be heated simultaneously. For example, the second electrically conductive heating field 6 may be configured such that with impingement by an on-board voltage of 12 to 48 V, a specific heating output of 3 to 6 watts/dm2 is obtained. For example, the first electrically conductive heating zone 3 may be configured such, by adapting the coating pattern, that with impingement by an onboard voltage of 12 to 48V, a specific heating output of 5 to 20 watts/dm2 is obtained.

The invention claimed is:

1. An electrically heatable glazing panel comprising:
    a substrate; and
    a first electrically heatable zone comprising:
    i) a transparent, electrically conductive coating layer,
    ii) first and second spaced bus bars adapted to supply electrical voltage across the transparent, electrically conductive coating layer, and
    iii) a conductive pathway defined between the first and the second spaced bus bars;
    wherein the conductive pathway is provided by a pattern of coated and decoated regions in the transparent, electrically conductive coating layer of the first electrically heatable zone to affect electrical resistivity of the transparent, electrically conductive coating layer in the first electrically heatable zone, and
    wherein the first electrically heatable zone is delimited by a windshield wiper rest area.

2. The electrically heatable glazing panel according to claim 1, wherein the electrically heatable glazing panel is a heating laminated vehicle windshield window comprising two glass sheets joined together by a thermoplastic interlayer, comprising the transparent, electrically conductive coating layer covering most of a surface of a windshield glass sheet electrically powered by the first and second spaced bus bars located at least in the windshield wiper rest area delimiting the first electrically heatable zone.

3. The electrically heatable glazing panel according to claim 2, wherein the first electrically heatable zone comprises a lower edge of the electrically heatable glazing panel.

4. The electrically heatable glazing panel according to claim 2, wherein the busbars are located at least horizontally along the windshield wiper rest area and from either side of the first electrically heatable zone along a length of a lower edge of the electrically heatable glazing panel.

5. The electrically heatable glazing panel according to claim 1, wherein the pattern within the transparent, electrically conductive coating layer of the first electrically heatable zone is obtained by applying a mask on a glass sheet during coating the transparent, electrically conductive coating layer.

6. The electrically heatable glazing panel according to claim 1, wherein the pattern includes a succession of parallel patterns having a form of a succession of zigzag or sinusoid lines forms.

7. The electrically heatable glazing panel according to claim 1, wherein the pattern is located in position of the electrically heatable glazing panel.

8. The electrically heatable glazing panel according to claim 1, wherein the transparent, electrically conductive coating layer has a resistance between 0.5 and 25 ohms/square.

9. The electrically heatable glazing panel according to claim 1, wherein the electrically heatable glazing panel is thermally toughened.

10. The electrically heatable glazing panel according to claim 1, wherein the electrically heatable glazing panel is laminated.

11. The electrically heatable glazing panel according to claim 1, further comprising a second electrically heatable zone, wherein the first and the second electrically heatable zones are continuously electrically connected by the transparent, electrically conductive coating layer.

12. A heatable laminated vehicle windshield window comprising:
   first and second glass sheets joined together by a thermoplastic interlayer;
   a transparent, electrically conductive coating layer on a surface of the first glass sheet;
   a first electrically heatable zone comprising:
   i) a portion of the transparent, electrically conductive coating layer,
   ii) first and second spaced bus bars and located at least in a wiper rest area delimiting the first electrically heatable zone, the first and second bus bars adapted to supply electrical voltage across the transparent, electrically conductive coating layer, and
   iii) a conductive pathway defined between the first and the second spaced bus bars;
   wherein the conductive pathway is provided by a pattern of coated and decoated regions in the transparent, electrically conductive coating layer of the first electrically heatable zone to affect electrical resistivity of the transparent, electrically conductive coating layer in the first electrically heatable zone, and
   wherein each coated region is configured to have a non-uniform width over a length of such coated region.

13. The heatable laminated vehicle windshield window according to claim 12, wherein the first electrically heatable zone extends substantially in the wiper rest area on a lower edge of the first glass sheet.

14. The electrically heatable glazing panel according to claim 1, wherein a width of the coated regions is between 500 µm and 5 mm.

15. The electrically heatable glazing panel according to claim 1, wherein the pattern of coated and decoated regions comprises a series of parallel and identical coated regions.

16. The electrically heatable glazing panel according to claim 2, wherein the pattern of coated and decoated regions comprises a series of parallel and identical coated regions.

17. The electrically heatable glazing panel according to claim 12, wherein a width of the coated regions is between 500 µm and 5 mm.

18. The electrically heatable glazing panel according to claim 12, wherein the pattern of coated and decoated regions comprises a series of parallel and identical coated regions.

19. The electrically heatable glazing panel according to claim 13, wherein the pattern of coated and decoated regions comprises a series of parallel and identical coated regions.

20. The electrically heatable glazing panel according to claim 12, wherein the width of each coated region varies along its length in parallel with width variations in adjacent coated regions.

21. An electrically heatable glazing panel comprising:
   a substrate; and
   a first electrically heatable zone comprising:
   i) a transparent, electrically conductive coating layer,
   ii) first and second spaced bus bars adapted to supply electrical voltage across the transparent, electrically conductive coating layer, and
   iii) a conductive pathway defined between the first and the second spaced bus bars;
   wherein the conductive pathway is provided by a pattern of coated and decoated regions in the transparent, electrically conductive coating layer of the first electrically heatable zone to affect electrical resistivity of the transparent, electrically conductive coating layer in the first electrically heatable zone, and
   wherein a width of the coated regions is between 500 µm and 5 mm.

22. The electrically heatable glazing panel according to claim 1,
   wherein the transparent, electrically conductive coating layer covers at least 60% of the electrically heatable glazing panel.

23. The electrically heatable glazing panel according to claim 22, wherein the transparent electrically conductive coating layer covers at least 60% of the electrically heatable glazing panel but does not cover:
   (i) a communication window; and
   (ii) optionally a non-coated edge region.

24. The electrically heatable glazing panel according to claim 1, wherein the first and second spaced bus bars are parallel.

25. The electrically heatable glazing panel according to claim 21, wherein the pattern includes a succession of parallel patterns having a form of a succession of zigzag or sinusoidal forms.

* * * * *